United States Patent
Christopher et al.

(10) Patent No.: US 6,732,268 B1
(45) Date of Patent: May 4, 2004

(54) METHOD AND SYSTEM FOR CONTROLLING ORIENTATION-DEPENDENT COMPONENTS IN A COMPUTER SYSTEM

(75) Inventors: Robert Joseph Christopher, Chapel Hill, NC (US); William Craig Troop, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 09/678,118

(22) Filed: Oct. 2, 2000

(51) Int. Cl.[7] .............................. G06F 9/44; G06F 1/24
(52) U.S. Cl. ......................................... 713/100
(58) Field of Search .................... 713/1, 100

(56) References Cited

U.S. PATENT DOCUMENTS 6,538,636 B1 * 3/2003 Harrison ..................... 345/156
6,597,384 B1 * 7/2003 Harrison ..................... 345/905

* cited by examiner

Primary Examiner—Thomas M. Heckler
(74) Attorney, Agent, or Firm—Sawyer Law Group

(57) ABSTRACT

A first aspect of the present invention is a method controlling an orientation-dependent component in a computer system. The method comprises the steps of interpreting a signal, the signal being based on an orientation of the computer system and automatically reconfiguring the orientation-dependent component based on the interpretation of the signal. A second aspect of the present invention is a system for controlling an orientation-dependent component in a computer system. The system comprises means for interpreting a signal, the signal being based on an orientation of the computer system and means for automatically reconfiguring the orientation-dependent component based on the interpretation of the signal. Through the use of the method and system in accordance with the present invention, orientation-dependent components are automatically reconfigured when a computer is changed from a rack orientation to a tower orientation (or vice versa) without having to manually adjust the settings of the components.

32 Claims, 8 Drawing Sheets

In a computer system that includes an orientation-dependent component, a signal is interpreted based on the orientation of the computer system.
14

Automatically reconfigure the orientation-dependent component based on the interpretation of the signal.
16

FIG. 4

In a computer system that includes an orientation-dependent component, a signal is interpreted based on the orientation of the computer system.
14

Automatically reconfigure the orientation-dependent component based on the interpretation of the signal.
16

METHOD AND SYSTEM FOR CONTROLLING ORIENTATION-DEPENDENT COMPONENTS IN A COMPUTER SYSTEM

FIELD OF THE INVENTION

The present invention relates generally to computer systems and particularly to a method and system for controlling orientation-dependent components in a computer system.

BACKGROUND OF THE INVENTION

Large installation computer networks typically incorporate server computers (servers) to provide services to the other computers within the networks. FIG. 1 shows a typical computer network configuration. The configuration comprises a plurality of interconnected server computers 10. The functions performed by each of these servers vary depending on the network and the server's place within the particular network. For example, at least one server typically functions as "file server" for the network. A computer functioning as a file server will usually have significantly more data storage capacity than the other computers connected to the network. The networked computers utilize this data storage capacity to store files and databases. Software executed by the file server controls access to these files and databases.

Each server within the network can be either in a tower or rack orientation. FIG. 2(a) and FIG. 2(b) respectively represent tower and rack computer orientations. Each computer includes a user panel 11, 12 that displays information based on certain system-level parameters and mechanical orientations. Each computer may also include a plurality of hard file slots (not shown) each of which has a unique address within the system.

The user panels 11, 12 as well as the unique addresses of the plurality of hard file slots are orientation-dependent i.e. their orientation or setting within the computer system is based on the orientation of the computer system. For example, in the tower orientation, the information in the user panel is oriented in a left to right, up-down fashion as shown. However, in many instances the orientation of a computer system must change from a tower orientation to a rack orientation or vice versa. For example, this typically involves rotating a computer in the tower orientation approximately 90 degrees as shown in FIG. 3. As a result, in order for the information in the user panel 11 to be more easily interpreted, the manner in which the information is displayed must be reconfigured i.e. the icons on display in the user panel 11 must be rotated approximately 90 degrees. This typically requires manual intervention wherein the computer system is physically opened and the settings of the computer system are manually adjusted. Consequently, manual intervention can be time-consuming, and affords an opportunity to introduce configuration errors.

Accordingly, what is needed is a system and method for reconfiguring how information is displayed in a computer system that does not require manual intervention. The method and system should be simple, cost effective and capable of being easily adapted to existing technology. The present invention addresses such a need.

SUMMARY OF THE INVENTION

A first aspect of the present invention is a method for controlling orientation-dependent components in a computer system. The method comprises the steps of interpreting a signal, the signal being based on an orientation of the computer system and automatically reconfiguring the orientation-dependent components based on the interpretation of the signal.

A second aspect of the present invention is a system for controlling orientation-dependent components in a computer system. The system comprises means for interpreting a signal, the signal being based on an orientation of the computer system and means for automatically reconfiguring the orientation-dependent components based on the interpretation of the signal.

Through the use of the method and system in accordance with the present invention, orientation-dependent components are automatically reconfigured when a computer is changed from a rack orientation to a tower orientation (or vice versa) without having to manually adjust the component settings.

BRIEF DESCRIPTION OF THE DRAWINGS

FIG. 4 is a high level flowchart of the method in accordance with the present invention.

DETAILED DESCRIPTION

The present invention relates to a method and system for controlling orientation-dependent components of a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is presented in the context of a preferred embodiment. The preferred embodiment of the present invention is a method and system for controlling orientation-dependent components of a computer system. In accordance with the present invention, manual intervention is not required to change the settings of orientation-dependent components when the orientation of the system is changed from a rack orientation to a tower orientation (or vice versa). This saves time and eliminates the possible introduction of a configuration error during a manual intervention.

For a better understanding of the method in accordance with the present invention please refer now to FIG. 4. FIG. 4 is a high level flowchart of the method in accordance with the present invention. First, in a computer system that includes an orientation-dependent component, a signal is interpreted based on the orientation of the computer system, via step 14. Orientation-dependent components comprise components capable of being reconfigured based on the orientation of the computer system. An example of such a component is a user panel. Preferably, the user panel comprises a touch sensitive, flat panel display that displays information related to the computer system. Preferably, this information comprises light emitting diode (LED) indicators and/or icons that are related to disk drive activity, the detection of a problem within the system, etc. Next, the orientation-dependent component is automatically reconfigured based on the interpretation of the signal, via step 16.

Figure 1:
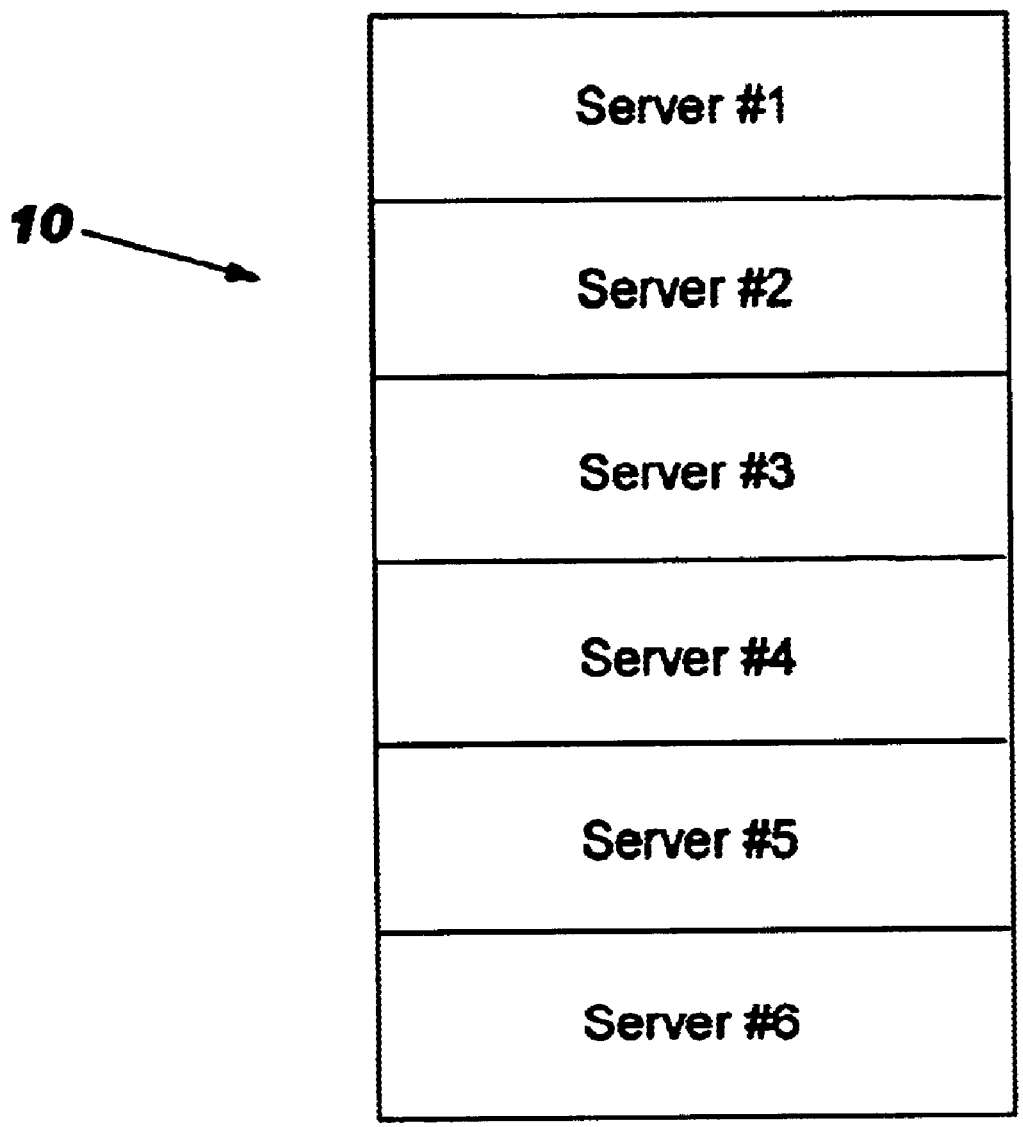
FIG. 1 shows a typical computer network configuration.
Figure 2A:
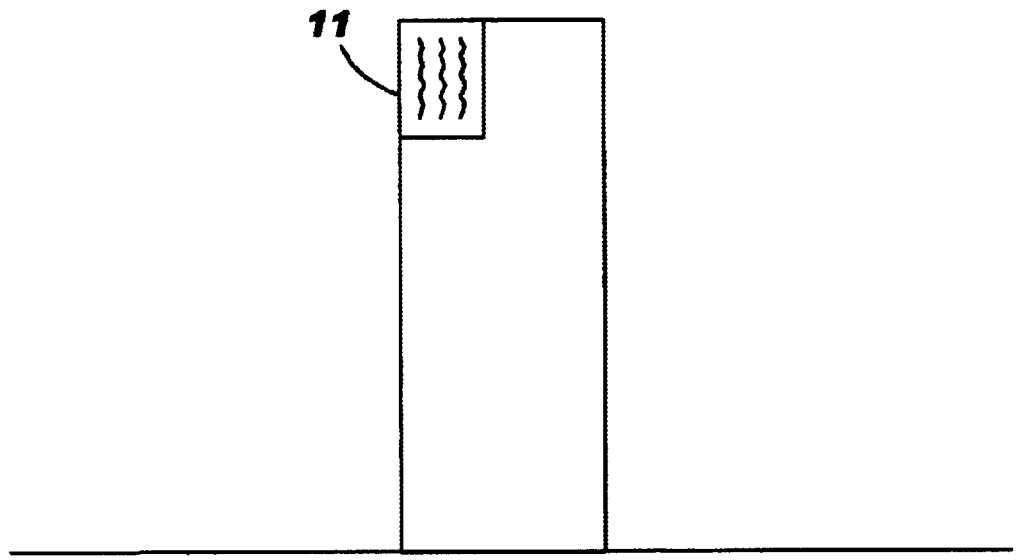
FIG. 2(a) shows a typical tower configuration.
Figure 2B:
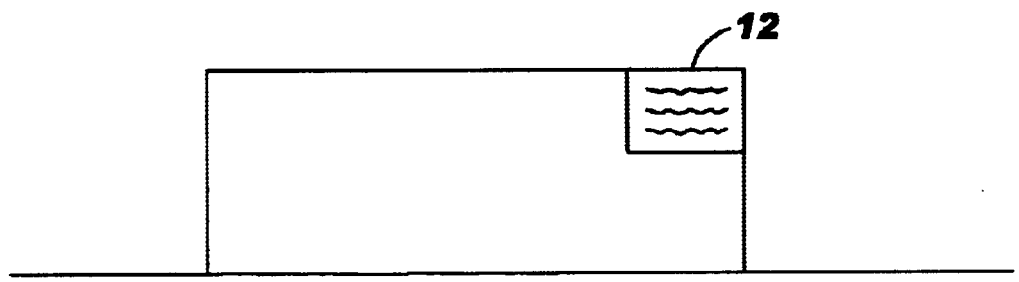
FIG. 2(b) shows a typical rack configuration.
Figure 3:
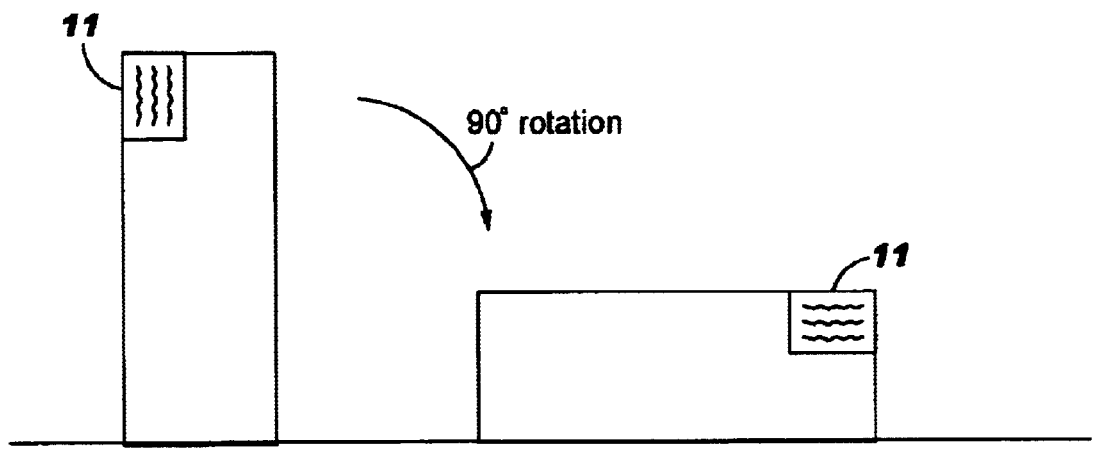
FIG. 3 shows a tower configuration is changed to a rack configuration.
Figure 5:
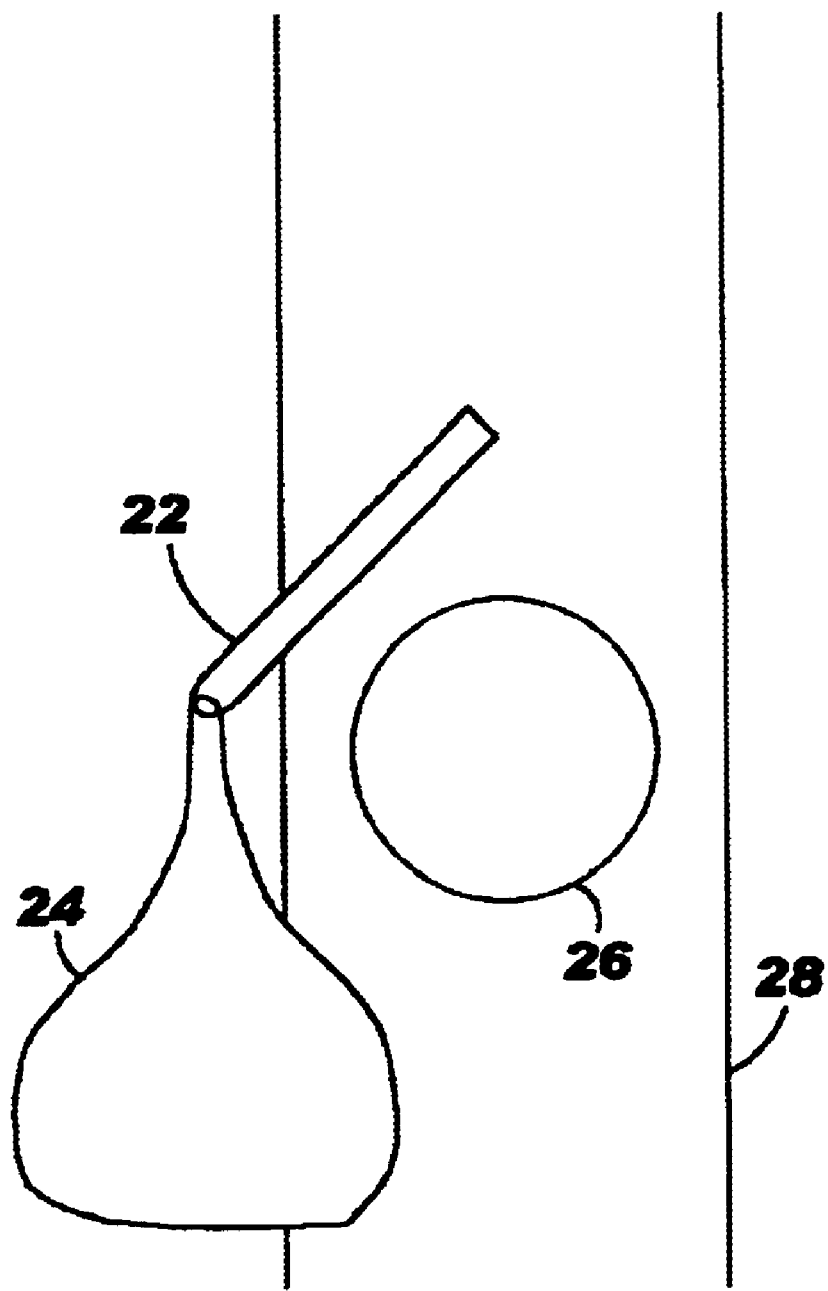
FIG. 5 shows an example of a simple orientation sensor.

In order to automatically reconfigure orientation-dependent component, an orientation sensor is utilized. The orientation sensor that is utilized in conjunction with the method in accordance with the present invention is preferably simple, cost effective and capable of being easily adapted to any computer system. FIG. 5 shows an example of a simple orientation sensor 20. The orientation sensor 20 preferably comprises an optical sensor 26 that is mounted to the computer system 28 and an object 24 rotatably coupled to the computer system 28 via a fixedly mounted connection rod 22. The object 24 is preferably a small piece of molded plastic or another suitable material.

Figure 6A:
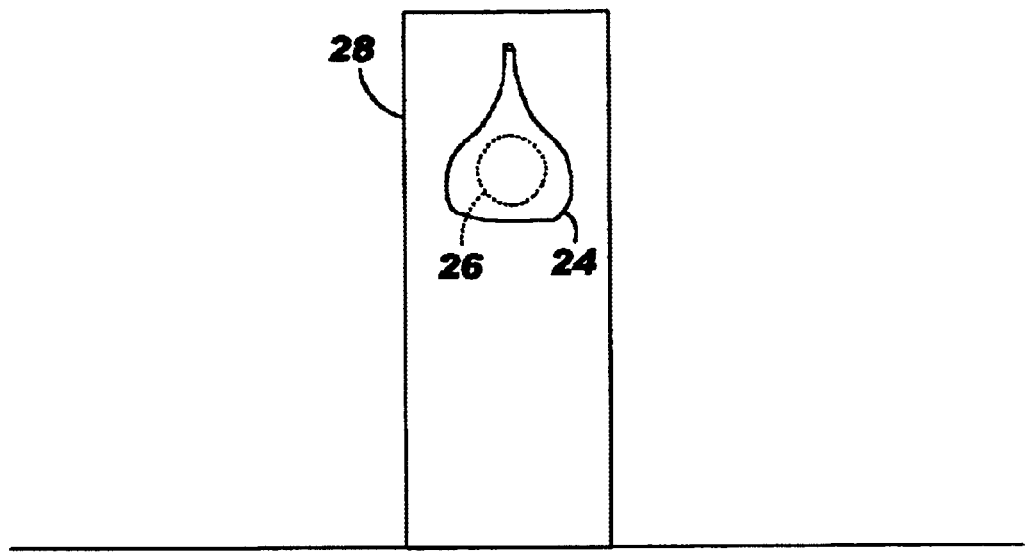
FIG. 6(a) shows a tower configuration in accordance with the present invention.
Figure 6B:
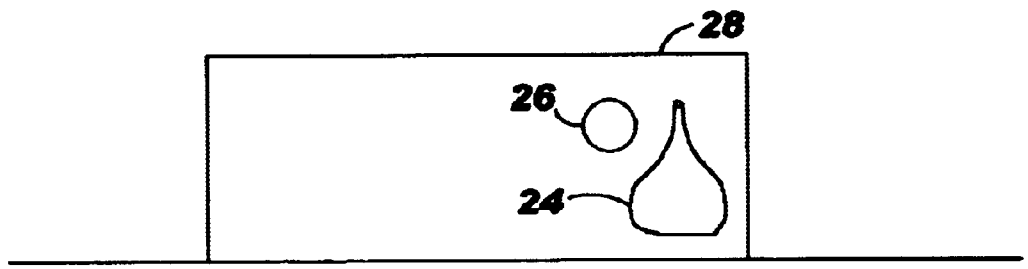
FIG. 6(b) shows a rack configuration in accordance with the present invention.

Because the object 24 is rotatably coupled to the connection rod 22 wherein the connection rod 22 is fixedly mounted to the computer system 28, the rotational movement of the object 24 is relative to the movement of the computer system 28. For example, for a tower orientation, the object 24 could hang directly in front of the optical sensor 26. (See FIG. 6(*a*).) If the computer system 28 is subsequently repositioned to the rack orientation, the object 24 rotates approximately 90 degrees due to gravitational forces and is no longer directly in front of the optical sensor 26. (See FIG. 6(*b*).)

The optical sensor 26 generates a signal to the computer system 28 based on the position of the object 24. For example, if the object 24 is directly in front of the optical sensor 26 (tower orientation) a particular signal is generated whereas if the object 24 is not in front of the optical sensor 26 (rack orientation) a different signal is generated. Consequently, based on an interpretation of the signal generated by the optical sensor 26, the orientation-dependent component is automatically reconfigured accordingly.

Figure 7:
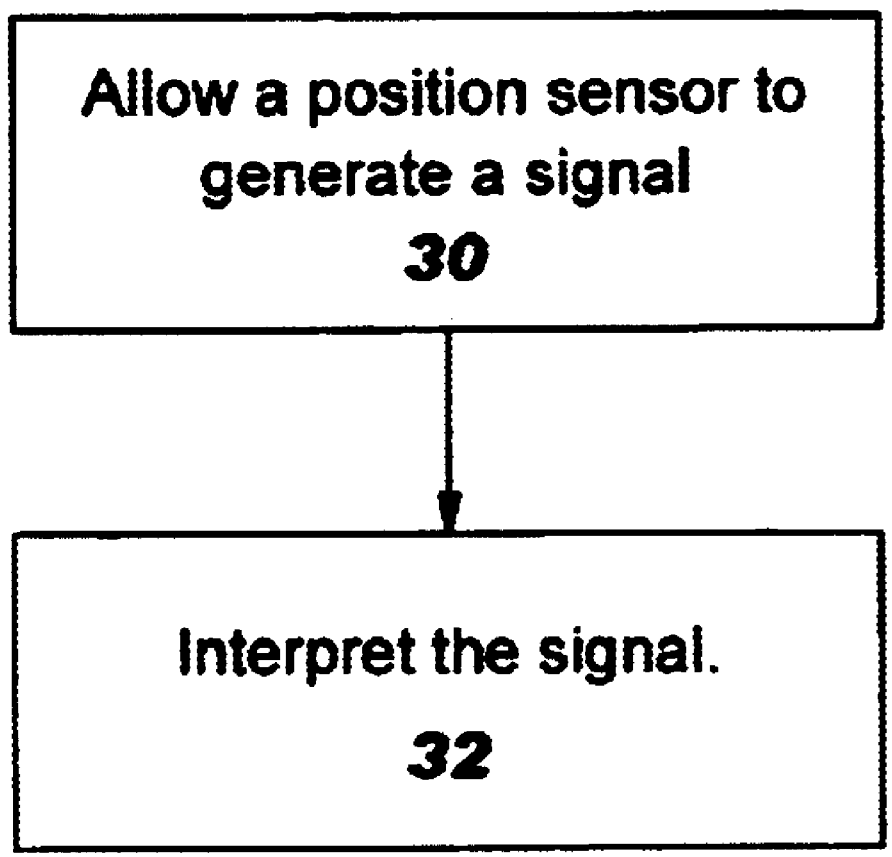
FIG. 7 is a detailed flowchart of step 12 of FIG. 4.

For a more detailed description of the method in accordance with the present invention, please refer now to FIG. 7. FIG. 7 is a detailed flowchart of step 14 of FIG. 4. First, the orientation sensor generates a signal, via step 30. Preferably, the signal is generated based on the orientation of the computer system. Next, the signal is interpreted, via step 32. Preferably this interpretation is done during an initialization of the computer system e.g. when the computer system is turned on or restarted. Furthermore, the interpretation corresponds to either a rack or tower orientation and the orientation-dependent component is reconfigured if necessary.

Although the preferred embodiment of the method in accordance with present invention contemplates employing the above-described orientation sensor, one of ordinary skill in the art will readily recognize that a variety of orientation sensors could be utilized while remaining within the spirit and scope of the present invention. A orientation sensor that does not rely on gravity could be implemented while remaining within the spirit and scope of the present invention. For example, a sensor that is configured to recognize the addition of certain mechanical components (i.e. mounting rails for the rack configuration or floor legs for the tower configuration) could also be implemented.

Figure 8:
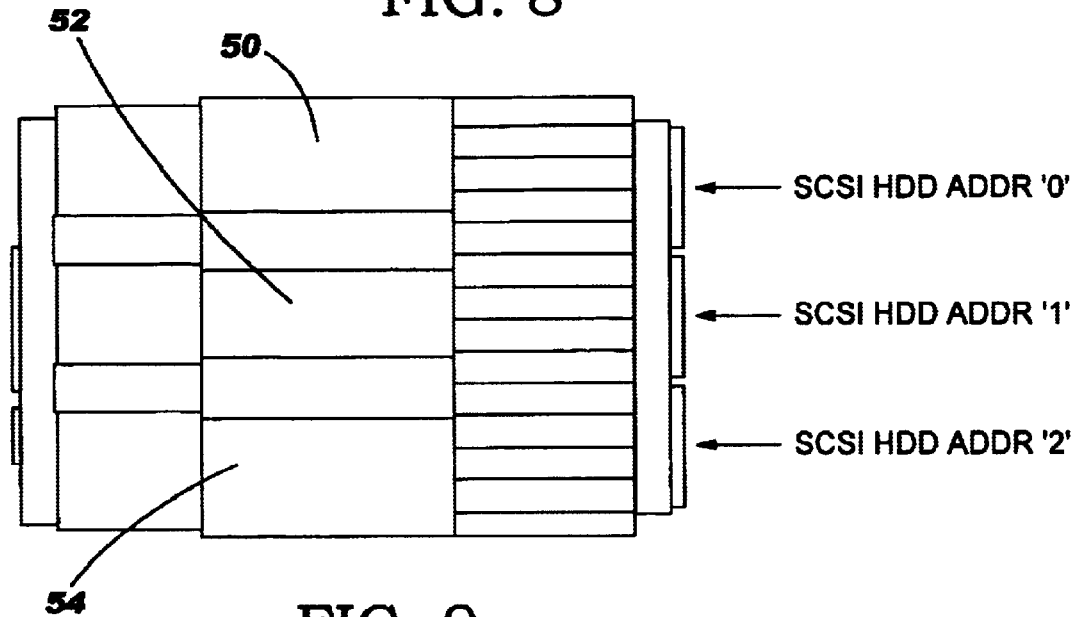
FIG. 8 shows a plurality of hard drives in a rack configuration.

Additionally, the present invention is preferably capable of changing the assignment of hard drive addresses in response to a change from a rack orientation to a tower orientation (or vice versa). Please refer now to FIG. 8. FIG. 8 shows a plurality of hard drives 50, 52, 54 in a rack configuration. In this configuration, the hard drives are always numbered wherein the topmost hard drive 50 is the lowest address within the group of addresses (e.g. address '0').

Figure 9:
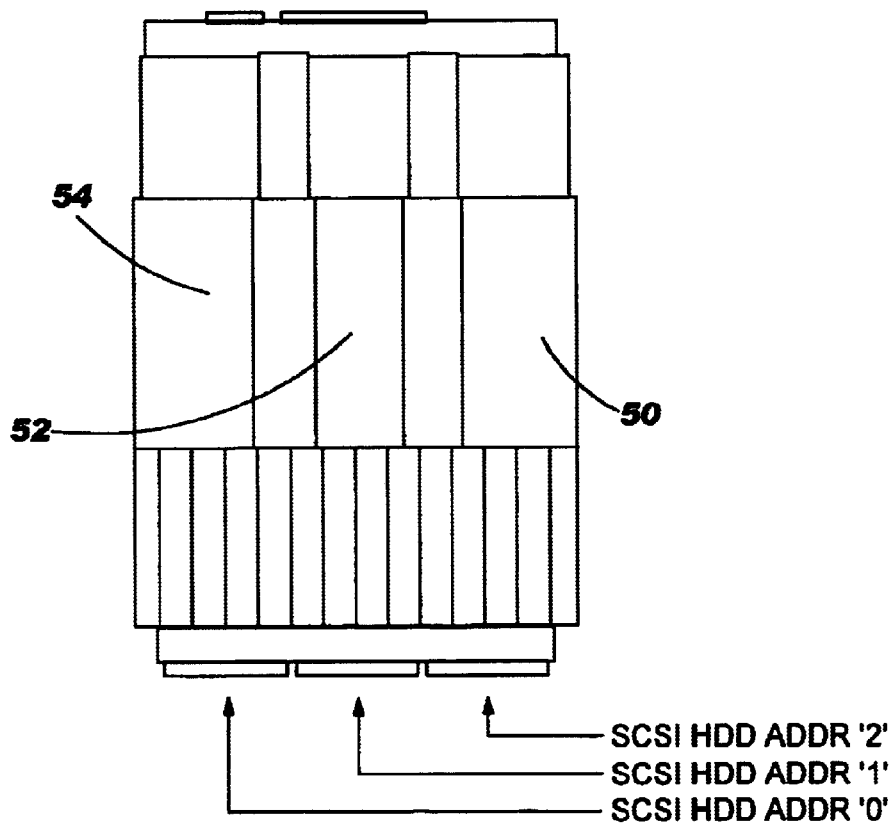
FIG. 9 shows a plurality of hard drives in a tower configuration.

Please refer now to FIG. 9. FIG. 9 shows the plurality of hard drives 50, 52, 54 after being rotated approximately 90 degrees to a tower configuration. In the tower configuration, the hard drives are usually numbered wherein the leftmost hard drive is the lowest address within the group of addresses. Consequently, the present invention automatically changes the address of the leftmost hard drive 54 (which was address '2' in the rack configuration) to address '0' and renumbers the remaining hard drives 50, 52 accordingly.

The method in accordance with the present invention may also be implemented, for example, by operating the computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for recovering retained locks in a plurality of systems.

This computer readable media may comprise, for example, RAM (not shown) contained within the system. Alternatively, the instructions may be contained in another computer readable media such as a magnetic data storage diskette and directly or indirectly accessed by the system. Whether contained in the system or elsewhere, the instructions may be stored on a variety of machine readable storage media, such as a DASD storage (e.g. a conventional "hard drive" or a RAID array), magnetic tape, electronic read-only memory (e.g., ROM, CD-ROM, EPROM, or EEPROM), an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Through the use of the method and system in accordance with the present invention, orientation-dependent components are automatically reconfigured when a computer is changed from a rack orientation to a tower orientation (or vice versa) without having to manually adjust the settings of the components. This saves time and eliminates the possible introduction of a configuration error during a manual intervention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling an orientation-dependent component of a computer system, the method comprising:
   a) interpreting a signal, the signal being based on an orientation of the computer system, wherein the orientation-dependent component comprises a plurality of addresses for hard drive slots; and
   b) automatically reconfiguring the plurality of addresses based on the interpretation of the signal.

2. The method of claim 1 wherein the computer system includes an orientation sensor.

3. The method of claim 2 wherein step a) further comprises:
   a1) allowing the orientation sensor to generate the signal based on the orientation of the computer system; and
   a2) interpreting the generated signal.

4. The method of claim 3 wherein the orientation-dependent component comprises a component whose settings are capable of being reconfigured.

5. The method of claim 4 wherein steps a) and b) are performed during an initialization of the computer system.

6. The method of claim 5 wherein the orientation is a rack-type orientation.

7. The method of claim 5 wherein the orientation is a tower-type orientation.

8. A system for controlling an orientation-dependent component of a computer system, the system comprising:
   means for interpreting a signal, the signal being based on an orientation of the computer system, wherein the orientation-dependent component comprises a plurality of addresses for hard drive slots; and
   means for automatically reconfiguring the plurality of addresses based on the interpretation of the signal.

9. The system of claim 8 wherein the means for interpreting a signal includes an orientation sensor.

10. The system of claim 9 wherein the means for interpreting a signal further comprises:
    means for allowing the orientation sensor to generate the signal based on the orientation of the computer system; and
    means for interpreting the generated signal.

11. The system of claim 10 wherein the orientation-dependent component comprises a component whose settings are capable of being reconfigured.

12. The system of claim 11 wherein the automatic reconfiguration of how the information is displayed is performed during an initialization of the computer system.

13. The system of claim 12 wherein the orientation is a rack-type orientation.

14. The system of claim 12 wherein the orientation is a tower-type orientation.

15. A computer readable medium comprising program instructions for controlling an orientation-dependent component of a computer system, the program instructions which when executed by a computer system cause the computer system to execute a method comprising:
    a) interpreting a signal, the signal being based on an orientation of the computer system, wherein the orientation-dependent component comprises a plurality of addresses for hard drive slots; and
    b) automatically reconfiguring the plurality of addresses based on the interpretation of the signal.

16. The computer readable medium of claim 15 wherein the computer system includes an orientation sensor.

17. The computer readable medium of claim 16 wherein step a) further comprises:
    a1) allowing the orientation sensor to generate the signal based on the orientation of the computer system; and
    a2) interpreting the generated signal.

18. The computer readable medium of claim 17 wherein the orientation-dependent component comprises a component whose settings are capable of being reconfigured.

19. The computer readable medium of claim 18 wherein steps a) and b) are performed during an initialization of the computer system.

20. The computer readable medium of claim 19 wherein the orientation is a rack-type orientation.

21. The computer readable medium of claim 19 wherein the orientation is a tower-type orientation.

22. A computer system comprising:
    an orientation-dependent component related to the computer system, wherein the orientation-dependent component comprises a plurality of addresses for hard drive slots;
    an orientation sensor coupled to the computer system; and
    a mechanism for reconfiguring the plurality of addresses based on the orientation sensor.

23. The computer system of claim 22 wherein the orientation sensor generates a signal based on the orientation of the computer system.

24. The computer system of claim 23 wherein the mechanism reconfigures the orientation-dependent component based on the signal.

25. The computer system of claim 24 wherein the orientation-dependent component comprises a component whose settings are capable of being reconfigured.

26. The computer system of claim 25 wherein the reconfiguration of the orientation-dependent component is performed during an initialization of the computer system.

27. A method for controlling an orientation-dependent component of a computer system, the method comprising:
    a) providing an optical sensor coupled to the computer system;
    b) providing an object rotatably coupled to the computer system, wherein the object is directly in front of the optical sensor when the orientation of the computer system is in a first position, and wherein the object is not in front of the optical sensor when the orientation of the computer system is in a second position;
    c) interpreting a signal generated by the optical sensor, the signal being based on the orientation of the computer system; and
    d) automatically reconfiguring the orientation-dependent component based on the interpretation of the signal.

28. A system for controlling an orientation-dependent component of a computer system, the system comprising:
    means for providing an optical sensor coupled to the computer system;
    means for providing an object rotatably coupled to the computer system, wherein the object is directly in front of the optical sensor when the orientation of the computer system is in a first position, and wherein the object is not in front of the optical sensor when the orientation of the computer system is in a second position;
    means for interpreting a signal generated by the optical sensor, the signal being based on the orientation of the computer system; and
    means for automatically reconfiguring the orientation-dependent component based on the interpretation of the signal.

29. A computer readable medium comprising program instructions for controlling an orientation-dependent component of a computer system, the program instructions which when executed by a computer system cause the computer system to execute a method comprising:
   a) providing an optical sensor coupled to the computer system;
   b) providing an object rotatably coupled to the computer system, wherein the object is directly in front of the optical sensor when the orientation of the computer system is in a first position, and wherein the object is not in front of the optical sensor when the orientation of the computer system is in a second position;
   c) interpreting a signal generated by the optical sensor, the signal being based on the orientation of the computer system; and
   d) automatically reconfiguring the orientation-dependent component based on the interpretation of the signal.

30. A method for controlling an orientation-dependent component of a computer system, the method comprising:
   a) providing a sensor, wherein the sensor recognizes a type of mechanical component that is added to the computer system;
   a) interpreting a signal generated by the sensor, the signal being based on the type of mechanical component; and
   b) automatically reconfiguring the orientation-dependent component based on the interpretation of the signal.

31. A system for controlling an orientation-dependent component of a computer system, the system comprising:
   means for providing a sensor, wherein the sensor recognizes a type of mechanical component that is added to the computer system;
   means for interpreting a signal generated by the sensor, the signal being based on the type of mechanical component; and means for automatically reconfiguring the orientation-dependent component based on the interpretation of the signal.

32. A computer readable medium comprising program instructions for controlling an orientation-dependent component of a computer system, the program instructions which when executed by a computer system cause the computer system to execute a method comprising:
   a) providing a sensor, wherein the sensor recognizes a type of mechanical component that is added to the computer system;
   a) interpreting a signal generated by the sensor, the signal being based on the type of mechanical component; and
   b) automatically reconfiguring the orientation-dependent component based on the interpretation of the signal.

* * * * *